United States Patent
Kanbara (10) Patent No.: US 9,535,432 B2
(45) Date of Patent: Jan. 3, 2017

(54) COOLING SYSTEM CONTROL APPARATUS

(75) Inventor: Osamu Kanbara, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 534 days.

(21) Appl. No.: 14/007,249

(22) PCT Filed: Dec. 15, 2011

(86) PCT No.: PCT/JP2011/079075
§ 371 (c)(1),
(2), (4) Date: Oct. 9, 2013

(87) PCT Pub. No.: WO2012/127745
PCT Pub. Date: Sep. 27, 2012

(65) Prior Publication Data
US 2014/0025207 A1    Jan. 23, 2014

(30) Foreign Application Priority Data
Mar. 24, 2011  (JP) .................... 2011-066296

(51) Int. Cl.
G05D 23/19   (2006.01)
F25D 29/00   (2006.01)
A47F 3/04    (2006.01)

(52) U.S. Cl.
CPC ............... *G05D 23/19* (2013.01); *F25D 29/00* (2013.01); *A47F 3/0478* (2013.01);
(Continued)

(58) Field of Classification Search
CPC ............. F25B 2400/22; F25B 2500/19; F25B 2700/2104; F25B 2700/2106; F25D 2700/14; F25D 2500/04; A47F 3/0482
See application file for complete search history.

(56) References Cited

U.S. PATENT DOCUMENTS 5,025,984 A * 6/1991 Bird .................. G05D 23/1904
                                                     165/239
7,905,100 B2 * 3/2011 Thybo ................... F25D 21/006
                                                     340/585
(Continued)

FOREIGN PATENT DOCUMENTS

JP      63-150570 A    6/1988
JP      04-335977 A    11/1992
(Continued)

OTHER PUBLICATIONS

International Search Report in PCT/JP2011/079075 dated Jan. 31, 2012 with English Translation.

*Primary Examiner* — Crystal J Barnes-Bullock
(74) *Attorney, Agent, or Firm* — McDermott Will & Emery LLP (57) ABSTRACT

A control apparatus is configured for adjusting a control value for a refrigerating machine of a cooling system and performing control of the cooling system in conformity with an environmental condition. A controller has a data base having environmental condition cells in which control values for the refrigerating machine are respectively registered in association with respective environmental conditions. The control apparatus outputs a control value suitable for the present cooling state to the refrigerating machine, registers the control value in an environmental condition cell conformed with the present environmental condition and changes the control value to construct the data base when the environmental condition varies, the controller refers to an environmental condition cell conformed with the environmental condition, corrects a control value registered at the environmental condition cell in accordance with a tendency that the control value has been changed, and outputs the corrected control value to the refrigerating machine.

13 Claims, 8 Drawing Sheets

(52) U.S. Cl.
CPC ...... *F25B 2500/19* (2013.01); *F25D 2500/04* (2013.01); *F25D 2700/12* (2013.01); *F25D 2700/14* (2013.01)

(56) References Cited

U.S. PATENT DOCUMENTS

| | | | | |
|---|---|---|---|---|
| 7,975,497 B2 * | 7/2011 | Kaga | ................ | F25B 49/005 62/125 |
| 8,209,058 B2 * | 6/2012 | Kawaai | ................ | A47F 3/0482 62/129 |
| 8,341,970 B2 * | 1/2013 | Ouchi | ................ | F25D 21/002 62/151 |
| 9,322,564 B2 * | 4/2016 | Kanbara | ................ | F24F 11/006 |

FOREIGN PATENT DOCUMENTS

| | | |
|---|---|---|
| JP | 2001-091121 | 4/2001 |
| JP | 2001-091121 A | 4/2001 |
| JP | 2003-083660 A | 3/2003 |
| JP | 2004-057347 A | 2/2004 |
| JP | 2007-017072 A | 1/2007 |
| JP | 4183451 B2 | 11/2008 |

* cited by examiner

| ENVIRONMENTAL CONDITION | 10~15°C | 15~20°C | 20~25°C | 25~30°C |
|---|---|---|---|---|
| CONTROL VALUE | 0.3 | 0.2 | 0.1 | 0.05 |

FIG.7

| RELATIONSHIP BETWEEN CONTROL VALUES OF PREVIOUS CELL AND NEW CELL / TENDENCY OF CHANGE OF CONTROL VALUE AT PREVIOUS CELL | PREVIOUS > NEW | PREVIOUS < NEW |
|---|---|---|
| SUBSTANTIALLY FLAT | A | A |
| MODERATE INCREASE | A | C |
| MODERATE DECREASE | C | A |
| RAPID INCREASE | A | B |
| RAPID DECREASE | B | A |

FIG.8

| COUNTING RESULT | TENDENCY OF CHANGE |
|---|---|
| +5 ~ +6 | RAPID INCREASE |
| +2 ~ +4 | MODERATE INCREASE |
| −1 ~ 1 | SUBSTANTIALLY FLAT |
| −4 ~ −2 | MODERATE DECREASE |
| −6 ~ −5 | RAPID DECREASE |

VARIATION OF ENVIRONMENTAL CONDITION

COOLING SYSTEM CONTROL APPARATUS

RELATED APPLICATIONS

This application is the U.S. National Phase under 35 U.S.C. §371 of International Application No. PCT/JP2011/079075, filed on Dec. 15, 2011, which in turn claims the benefit of Japanese Application No. 2011-066296, filed on Mar. 24, 2011, the disclosures of which Applications are incorporated by reference herein.

TECHNICAL FIELD

The present invention relates to a control apparatus for a cooling system comprising a low-temperature showcase(s) installed in a supermarket or the like, and a refrigerating machine for supplying refrigerant to the low-temperature showcase(s).

BACKGROUND ART

Plural low-temperature showcases such as freezing/refrigerating showcases or the like are installed in a store such as a supermarket or the like, and provided to display and sell foods while freezing or refrigerating the foods. In this case, an evaporator of each low-temperature showcase is circulatingly supplied with refrigerant from a refrigerating machine installed at the outside of the store (in a machine room or the like). In this case, there is a case where different marker's products are used as the low-temperature showcase and the refrigerating machine respectively to construct a refrigeration circuit of a cooling system in some stores.

From the viewpoint of approach to environment problems and reduction in energy cost, much attention has been recently paid to countermeasures to reduce power consumption in a cooling system even in stores such as supermarkets, etc. In order to reduce the power consumption, it is important to enhance the operation efficiency of the low-temperature showcases and the refrigerating machine themselves, but it is possible to reduce the power consumption on the assumption that respective devices constituting the cooling system are cooperated with one another on the whole in the overall cooling system containing the low-temperature showcases and the refrigerating machine.

Therefore, there has been recently developed a control apparatus provided with a database having plural registration places each of which is associated with each of different environmental conditions, each environmental condition comprising a store inside (in-store) temperature, a store outside (out-of-store) temperature and a time zone. Control data concerning a low-pressure side pressure set value for stopping a refrigerating machine has been learned and stored at each registration place every environmental condition to thereby construct the database. The control data are used directly or used with correction thereto by referring to control data at a registration place conformed with a present environmental condition and determination result data as to whether the cooling state of the low-temperature showcase at that time is good or not (for example, see Patent Document 1).

According to the control apparatus described above, it is possible to predict the shift of the operation environment and perform fine control while quickly following the predicted shift.

PRIOR ART

Patent Document

Patent Document 1: Japanese Patent No. 4183451

SUMMARY OF THE INVENTION

Problem to be Solved by the Invention

However, there has been a problem that just after the registration place to be referred to is changed because the environmental condition varies, the registration place to be referred to corresponds to an intermediate position between the places before and after the environmental condition varies. Therefore, the control data at the registration place to be newly referred to is not necessarily the optimum control data.

The present invention has been implemented to solve the conventional technical problem described above, and has an object to provide a control apparatus that can more accurately adjust a control value for a refrigerating machine of a cooling system and more properly perform control of the cooling system in conformity with an environmental condition.

Means of Solving the Problem

According to the present invention, a control apparatus for a cooling system having a low-temperature showcase and a refrigerating machine for supplying refrigerant to the low-temperature showcase, is characterized by including a data base having environmental condition cells at which control values for the refrigerating machine are respectively registered in association with respective environmental conditions, wherein according to a present cooling state of the low-temperature showcase, the control apparatus outputs a control value suitable for the present cooling state to the refrigerating machine, registers the control value in an environmental condition cell conformed with the present environmental condition and changes the control value to thereby construct the data base, and when the environmental condition varies, the controller refers to an environmental condition cell conformed with the environmental condition, corrects a control value registered at the environmental condition cell in accordance with a tendency that the control value has been hitherto changed, and outputs the corrected control value to the refrigerating machine.

The control apparatus for the low-temperature showcase is characterized in that the environmental condition is an in-store temperature, an out-of-store temperature and a time zone in the above invention.

The control apparatus for the low-temperature showcase is characterized in that the control value for the refrigerating machine is a low-pressure side pressure set value for controlling an operation of the refrigerating machine in each of the above inventions.

The control apparatus for the low-temperature showcase is characterized in that the control value is changed in accordance with the cooling state of the low-temperature showcase so as to reduce power consumption of the refrigerating machine while the low-temperature showcase is kept to be cooled in each of the above inventions.

The control apparatus for the low-temperature showcase is characterized in that a control value at a new environmental condition cell to be newly referred to is corrected in accordance with the relationship between a control value at a previous environmental condition cell that has been hitherto referred to and the control value at the new environmental condition cell to be newly referred to and a tendency of change of the control value at the previous environmental condition cell in each of the inventions.

The control apparatus for the low-temperature showcase is characterized in that when the tendency of the change of the control value at the previous environmental condition cell stays substantially flat or has not changed, the control value is used even after variation of the environmental condition in the above invention.

The control apparatus for the low-temperature showcase is characterized in that when the tendency of the change of the control value at the previous environmental condition cell that has been hitherto referred to is moderate in a direction of non-cooling the low-temperature showcase, and the control value of the new environmental condition cell to be newly referred to has a tendency of more greatly cooling the low-temperature showcase than the control value of the previous environmental condition cell that has been hitherto referred to, a control value that has been hitherto referred to is used even after variation of the environmental condition.

The control apparatus for the low-temperature showcase is characterized in that when the tendency of the change of the control value at the previous environmental condition cell that has been hitherto referred to is moderate in a direction of non-cooling the low-temperature showcase, and the control value at the new environmental condition cell to be newly referred to has a tendency of more greatly non-cooling the low-temperature showcase than the control value of the previous environmental condition cell that has been hitherto referred to, an average value or weighted average efficiency between the control value that has been hitherto used and the control value of the new environmental condition cell is used after variation of the environmental condition.

The control apparatus for the low-temperature showcase is characterized in that when the tendency of the change of the control value at the previous environmental condition cell that has been hitherto referred to is moderate in a direction of more greatly cooling the low-temperature showcase and the control value of the new environmental condition cell to be newly referred to has a tendency of more greatly cooling the low-temperature showcase than the control value of the previous environmental condition cell that has been hitherto referred to, an average value or weighted average efficiency between the a control value that has been hitherto used and the control value of the new environmental condition cell to be newly referred is used after variation of the environmental condition.

The control apparatus for the low-temperature showcase is characterized in that the tendency of the change of the control value at the previous environmental condition cell that has bee hitherto referred to is moderate in a direction of cooling the low-temperature showcase sand the control value of the new environmental condition cell to be newly referred to has a tendency of more greatly non-cooling the low-temperature showcase than the control value of the previous environmental condition cell that has been hitherto referred to, the control value that has been hitherto used is used even after variation of the environmental condition.

The control apparatus for the low-temperature showcase is characterized in that the tendency of the change of the control value at the previous environmental condition cell that has been hitherto referred to is rapid in a direction of non-cooling the low-temperature showcase and the control value of the new environmental condition cell to be newly referred to has a tendency of more cooling the low-temperature showcase than the control value of the previous environmental condition cell that has bee hitherto referred to, the control value that has been hitherto used is used even after variation of the environmental condition.

The control apparatus for the low-temperature showcase is characterized in that the tendency of the change of the control value at the previous environmental condition that has been hitherto referred to is rapid in a direction of non-cooling the low-temperature showcase and the control value of the new environmental condition cell to be newly referred to has a tendency of more greatly non-cooling the low-temperature showcase than the control value of the previous environmental condition that has been hitherto referred to, the control value of the new environmental condition cell to be newly referred to is used after variation of the environmental condition.

The control apparatus for the low-temperature showcase is characterized in that when the tendency of the change of the control value of the previous environmental condition cell that has been hitherto referred to is rapid in a direction of cooling the low-temperature show case and the control value of the new environmental condition cell to be newly referred to has a tendency of more greatly cooling the low-temperature showcase than the control value of the previous environmental condition cell that has been hitherto referred to, the control value of the new environmental condition cell to be newly referred to is used after variation of the environmental condition.

The control apparatus for the low-temperature showcase is characterized in that when the tendency of the change of the control value of the previous environmental condition cell that has been hitherto referred to is rapid in a direction of cooling the low-temperature showcase and the control value of the new environmental condition cell to be newly referred to has a tendency of more greatly non-cooling the low-temperature showcase than the control value of the previous environmental condition cell that has been hitherto referred to, the control value that has been hitherto used is used even after variation of the environmental condition.

Effect of the Invention

According to the control apparatus of the present invention, the cooling system having a low-temperature showcase and a refrigerating machine for supplying refrigerant to the low-temperature showcase is provided with the data base having environmental condition cells at which control values for the refrigerating machine are respectively registered in association with respective environmental conditions. For example, according to a present cooling state of the low-temperature showcase, the control apparatus outputs a control value suitable for the present cooling state to the refrigerating machine, registers the control value in an environmental condition cell conformed with the present environmental condition and changes the control value to thereby construct the data base, and when the environmental condition varies, the controller refers to an environmental condition cell conformed with the environmental condition, corrects a control value registered at the environmental condition cell in accordance with a tendency that the control value has been hitherto changed as in the case of the invention, and outputs the corrected control value to the refrigerating machine. Therefore, fluctuation of the control value when the environmental condition to be referred to is switched is little, and the control can be more stably performed.

Accordingly, the control value can be prevented from being changed in a non-optimizing direction when the environmental condition cell to be referred to is shifted, more quickly converged to the optimum value, and the power consumption of the cooling system can be reduced more effectively while the required minimum cooling capacity for the low-temperature showcase can be secured. This is remarkably effective to a condition that learning based on each of environmental conditions is insufficient at an initial stage where the control apparatus is introduced.

In order to reduce the power consumption of the refrigerating machine as in the case of the invention, the low-pressure side pressure set value is output as the control value. Therefore, the control apparatus is adaptable to refrigerating machines other than an inverter type. Furthermore, the in-store temperature, the out-of-store temperature and the time zone are used as the environmental conditions as in the case of the invention, the invention can be surely adapted to not only seasons, but also a working condition of a store such as opening or closing, lighting or lights-out, supplement of goods, installation of a night cover or the like, a coming condition of customers, etc.

BEST MODE FOR CARRYING OUT THE INVENTION

Figure 1:
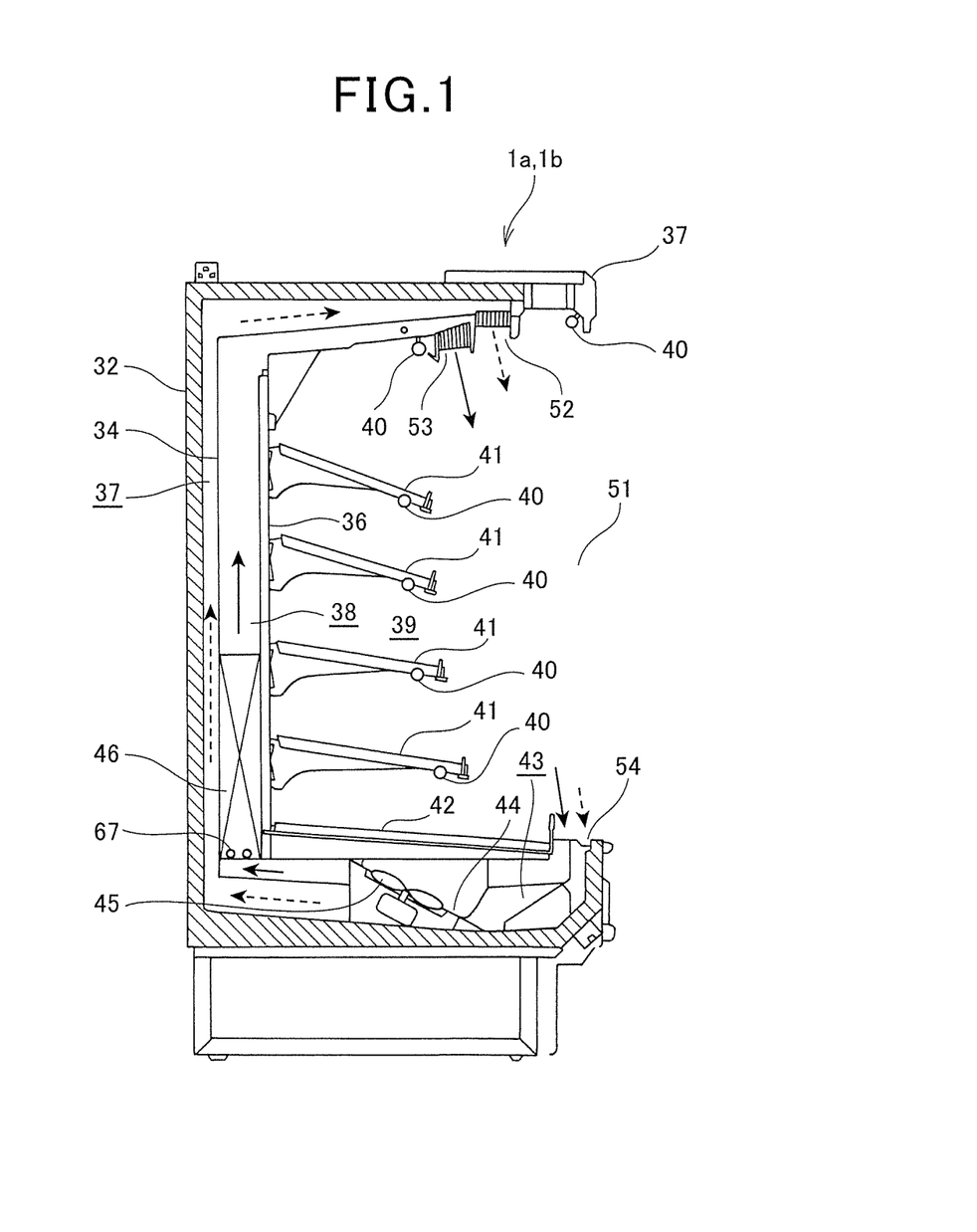
FIG. 1 is a longitudinally-sectional view of an embodiment of a low-temperature showcase constituting a cooling system to which the present invention is applied.
Figure 2:
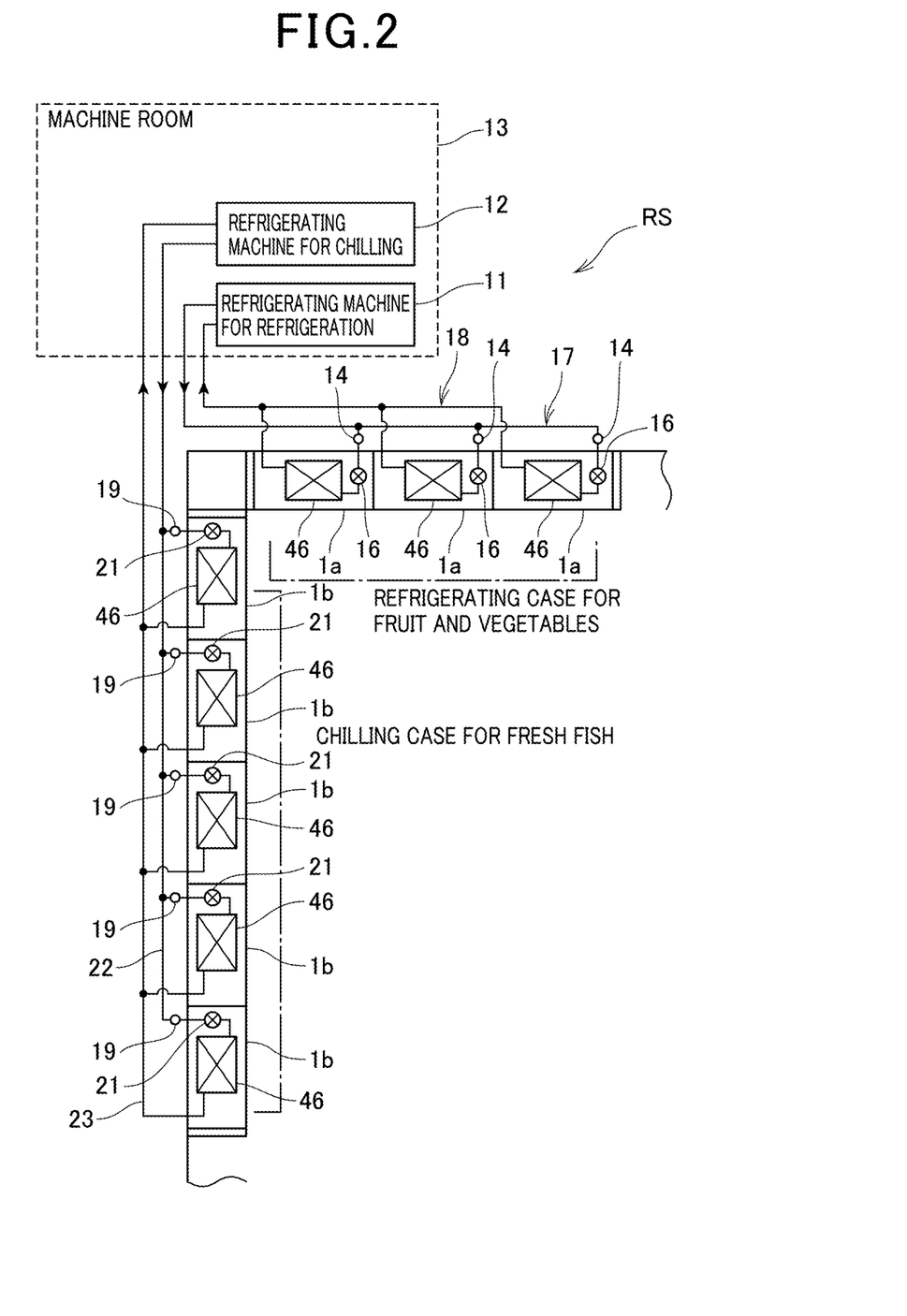
FIG. 2 is a diagram showing a piping structure of a supermarket in which low-temperature showcases shown in FIG. 1 are set up.
Figure 3:
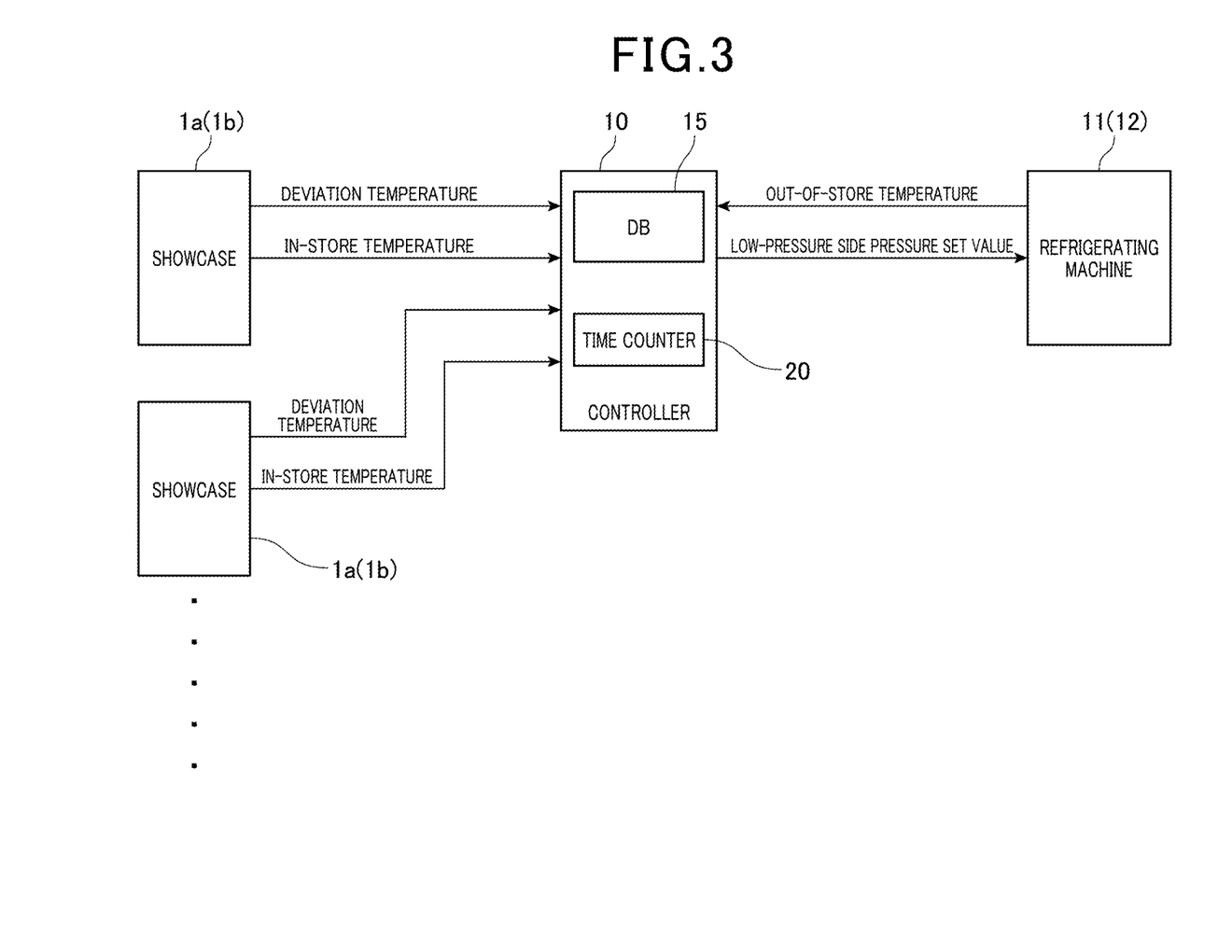
FIG. 3 is a control block diagram of a cooling system according to the present invention.

An embodiment according to the present invention will be described with reference to the drawings. FIG. 1 is a longitudinally sectional view showing a low-temperature showcase 1 as an embodiment to which the present invention is applied, FIG. 2 is a diagram showing a piping structure of a cooling system RS of a supermarket in which low-temperature showcases 1 are installed, and FIG. 3 is a control block diagram showing the cooling system RS according to the present invention.

The low-temperature showcase 1 of this embodiment is a vertical type open showcase, and it comprises a heat insulating wall 32 having a substantially U-shaped cross-section, and side plates (not shown) secured to both the sides of the heat insulating wall 32 at a set-up place. An outer layer partition plate 34 and an inner layer partition plate 36 are secured on the inside of the heat insulating wall 32 so as to be spaced from each other. The gap between the heat insulating wall 32 and the outer layer partition plate 34 serves as an outer layer duct 37, the gap between the inner and outer layer partition plates 36 and 34 serves as an inner layer duct 38, and the inside of the inner layer partition plate 36 serves as a storage chamber 39 (storage inside).

Shelves 41 of plural stages are constructed in the storage chamber 39, and fluorescent lamps 40 are secured to the front portions of the lower surfaces of the respective shelves 41 and the ceiling portion of the storage chamber 39 and inside eaves 37. A deck pan 42 is secured to the bottom portion of the storage chamber 39, and the lower side of the deck pan 42 serves as a bottom portion duct 43 intercommunicating with both the ducts 37, 38. A fan case 44 containing an air blower 45 therein is installed in the bottom portion duct 43. Furthermore, an evaporator 46 is vertically disposed at the lower portion in the inner layer duct 38 located at the back side of the storage chamber 39.

An outer layer discharge port 52 and an inner layer discharge port 53 are disposed at the upper edge of the front opening portion 51 of the storage chamber 39 in juxtaposition with each other at the front and rear sides, and the outer layer discharge port 52 intercommunicates with the outer layer duct 37 while the inner layer discharge port 53 intercommunicates with the inner layer duct 38. A suction port 54 is formed at the lower edge of the opening portion 51, and intercommunicates with the bottom portion duct 43.

When the air blower 45 in the fan case 44 is operated, air in the bottom portion duct 43 is blown out to the inner and outer layer ducts 37, 38 at the rear side. The air is directly blown up in the outer layer duct 37 whereas the air is heat-exchanged by the evaporator 46 and then blown up in the inner layer duct 38, and then these air is blown out from the inner and outer layer discharge ports 52, 53 at the upper edge of the opening portion 51 to the suction port 54 at the lower edge.

Accordingly, an inner cold air curtain and an outer air curtain for protecting the inner cold air curtain are formed at the opening portion 51 of the storage chamber 39, whereby intrusion of outside air from the opening portion 51 is prevented or suppressed and a part of the inner cold air curtain is circulated in the storage chamber 39 to cool the inside of the storage chamber 39. The opening portion 51 is blocked by a night cover (not shown) when the store is closed.

The cold air, etc. are returned from the suction port 54 into the bottom portion duct 43, and sucked into the air blower 45 again. Furthermore, a defrosting heater 67 is secured to the evaporator 46, and heats the evaporator 46 to melt frost on the evaporator 46.

In FIG. 2, 1a, . . . represents low-temperature showcases (refrigerating cases for fruit and vegetables) in which fruit and vegetables (goods) are accommodated and displayed, and three refrigerating cases are juxtaposed with one another. Furthermore, 1b, . . . represents low-temperature showcases (chilling cases for fresh fish) in which fish (goods) is accommodated and displayed, and five chilling cases are juxtaposed with one another.

The respective low-temperature showcases 1a, . . . , 1b, . . . are installed along the in-store wall surfaces in a supermarket as shown in FIG. 2. Reference numerals 11 and 12 represent separate placement types of a refrigerating machine for refrigeration (cooling) and a refrigerating machine for chilling which are constructed out of the store and are placed (separately placed) in a machine room. 13, and the cooling system RS according to the present invention is constructed by the low-temperature showcases 1a, . . . , 1b, . . . and the refrigerating machines 11 and 12.

Each refrigerating machine 11, 12 is constructed by a compressor and a condenser (not shown). Respective entrance port sides of the evaporators 46 of the low-temperature showcases 1a (refrigerating cases) are connected to a liquid refrigerant pipe 17 of the cooling refrigerating machine 11 through electromagnetic valves 14 and expansion valves 16 in parallel, and exit port sides of the evaporators 46 are connected to a gas refrigerant pipe 18 of the cooling refrigerating machine 11 in parallel.

Furthermore, respective entrance port sides of the evaporators 46 of the low-temperature showcases 1b (chilling cases) are connected to a liquid refrigerant pipe 22 of the chilling refrigerating machine 12 through electromagnetic valves 19 and expansion valves 21 in parallel, and exit port sides of the evaporators 46 are connected to a gas refrigerant pipe 23 of the freeing-temperature refrigerating machine 11 in parallel.

A control apparatus for the respective low-temperature showcases 1a, 1b controls the opening/closing operation of the electromagnetic valves 14, 19 on the basis of the temperature of cold air in the storage chamber 39 or cold air blown into the storage chamber 39, supplies refrigerant to the evaporators 46 to cool the inside of the storage chamber 39. That is, an upper limit temperature and a lower limit temperature are set to the upper and lower sides of a temperature target value (set temperature) of the storage chamber 39, and the control apparatus executes ON-OFF control so as to open the electromagnetic valves 14, 19 at the upper limit temperature and close the electromagnetic valves 14, 19 at the lower limit temperature. Accordingly, the temperature inside the storage chamber 39 (in-storage temperature) is approached to the target vale as an average. However, a deviation temperature occurs between the target value and the actual temperature of the storage chamber 39 due to cooling capacity or surrounding environment.

The compressor of each of the refrigerating machines 11, 12 is operated when some electromagnetic value 14, 19 is opened. However, when the electromagnetic valves 14 or 19 are closed in all the low-temperature showcases 1a or 1b, the compressor is stopped. In this case, specifically, by using a low-pressure side pressure set value Ps of the refrigerant circuit, the controller for each refrigerating machine 11, 12 stops the compressor when the pressure at the low pressure side of the refrigerant circuit decreases to the low-pressure side pressure set value Ps because all the electromagnetic values 14 or 19 are closed. When the electromagnetic value 14 or 19 of some low-temperature showcase 1a or 1b is opened and the pressure at the low-pressure side increases to be higher than the low-pressure side pressure set value Ps (in this case, a predetermined hysteresis is provided), the compressor is actuated again.

The operation of the control apparatus (hereinafter referred to as controller) 10 for reducing the power consumption of the cooling system RS according to the present invention will be described with reference to FIG. 3. The controller 10 is constructed by a memory in which a data base 15 described later is constructed and a general-purpose microcomputer having a time counting function (represented by reference numeral 20). The respective controllers 10 are interposed between each low-temperature showcase 1a and the refrigerating machine 11 and also between each low-temperature showcase 1b and the refrigerating machine 12 to receive and deliver data.

In this case, each of the controllers 10, 10 is supplied with the (in-storage) deviation temperature of the storage chamber 39 described above and in-store temperature Ti from each low-temperature showcase 1a, 1b, and also supplied with out-of-store temperature To from each of the refrigerating machines 11, 12. Each of the controllers 10, 10 outputs the low-pressure side pressure set value Ps as a control value to each of the refrigerating machines 11, 12.

Next, a specific operation of the controller 10 described above will be described. The following description is made on the controller 10 interposed between each low-temperature showcase 1a and the refrigerating machine 11, but the same is applied to the controller 10 interposed between each low-temperature showcase 1b and the refrigerating machine 12.

First, the data base 15 described above is constructed in the memory of the controller 10. Environmental condition cells of data are classified in the data base 15 on the basis of three conditions of the in-store temperature Ti, the out-of-store temperature To and the time zone t as indexes for determining the condition of the operation environment (hereinafter referred to as environmental condition), and registered as discrete data classified at plural stages. In this case, the rule for discretization is as follows:

the in-store temperature Ti (° C.): the range from 0° C. to +35° C. is classified into eight stages every 5 degree (actually, an average value per hour is adopted);

the out-of-store temperature To (° C.): the range from −5° C. to +40° C. is classified into ten stages every 5 degree (actually, an average value per hour is adopted); and the time zone t: the time is classified into 24 stages every hour.

Environmental condition cells at totally 1920 places (represented by broken lines in FIG. 4) are constructed.

The in-store temperature Ti and the out-of-store temperature To are environmental conditions affected by natural environment. Furthermore, the cooling state of the low-temperature showcase 1a is affected by not only the natural environment, but also the frequency of taking foods in and out by clerks and customers, lights-out of illumination for the purpose of power saving when the store is closed, covering using a night cover, etc., but this condition can be determined on the basis of the time zone t.

With respect to calculation of the average value of deviation temperature described later, the clock time containing a calculation start time is set as the time zone t for the average value. For example, when an average deviation temperature is calculated on the basis of the deviation temperature for 60 minutes from 3:40 p.m. to 4:40 p.m., the time zone t is treated as 3 p.m. Furthermore, when the in-store temperature is lower than 0° C., it is treated as 0° C., and when the in-store temperature is higher than +35° C., it is treated as +35° C. When the out-of-store temperature is lower than −5° C., it is treated as −5° C., and when the out-of-store temperature is higher than +40° C., it is treated as +40° C.

Figure 4:
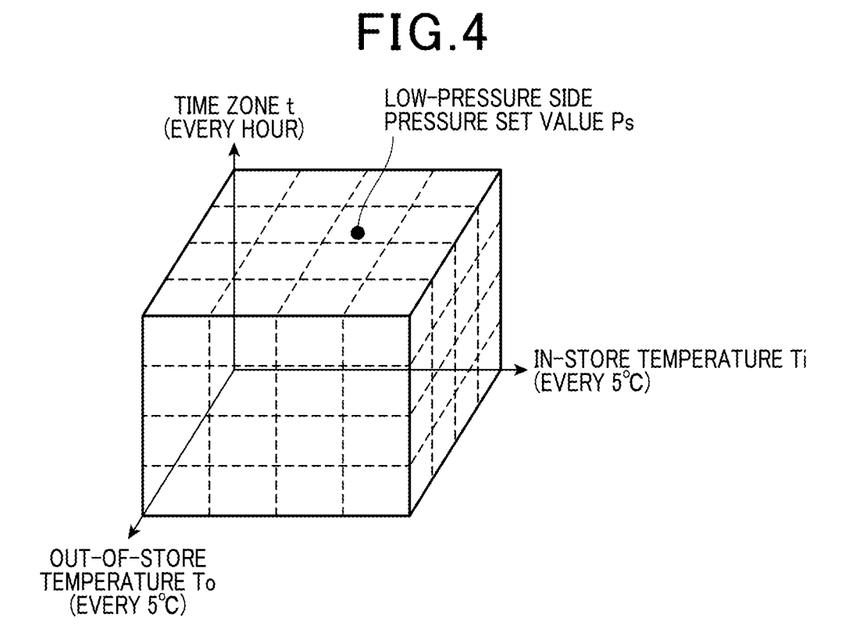
FIG. 4 is a diagram showing a data base of a controller of the cooling system according to the present invention.

The controller 10 registers the low-pressure side pressure set value Ps of the refrigerating machine 1 as a control value at each environmental condition cell of the data base 15.

Figure 5:
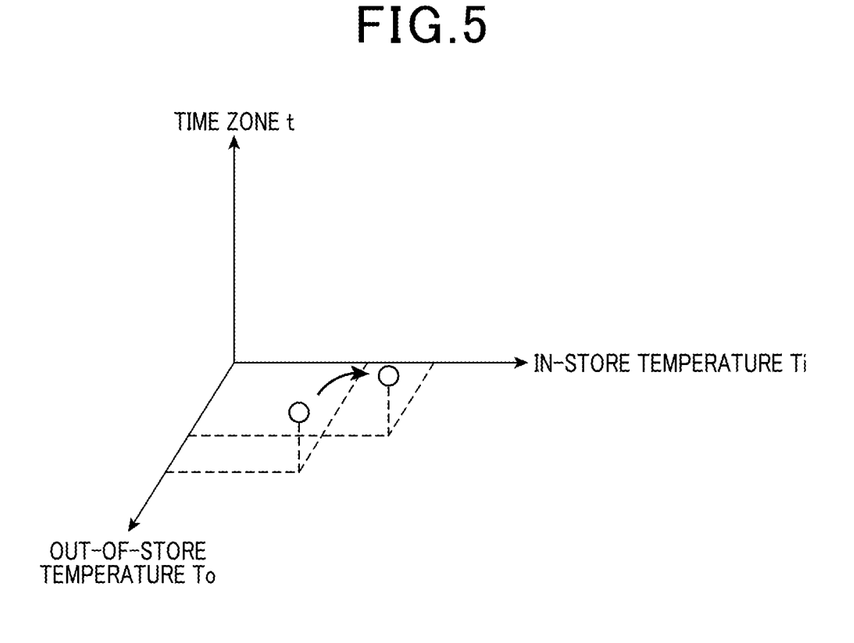
FIG. 5 is a diagram showing transition of an environmental condition cell to be referred to in FIG. 4.

An embodiment of the actual control will be described with the above construction. The controller 10 adjusts the low-pressure side pressure set value Ps of the refrigerating machine 11 on the basis of the data base 15 described above. The adjustment of the low-pressure side pressure set value Ps of the refrigerating machine 11 is executed at a predetermined period. In the following example, the adjustment executed at the period of 10 minutes will be described. Furthermore, the controller 10 refers to the low-pressure side pressure set value Ps (control value) registered at an environmental condition cell (FIG. 5) coincident with the environmental condition of the in-store temperature Ti, the out-of-store temperature To and the time zone t of the moment, performs the following correction and then outputs it as a control value to the refrigerating machine 11. In the refrigerating machine 11, the start/stop of the compressor is controlled as described above on the basis of the low-pressure side pressure set value Ps (control value) transmitted from the controller 10.

First, a default value is pre-registered as an initial value of the low-pressure side pressure set value Ps as the control value at all the environmental condition cells of the data base 15. Accordingly, at the initial stage where the low-temperature showcases 1a and the refrigerating machine 11 are installed in the supermarket, the low-pressure side pressure set value Ps is set to the default value. The default value is set to a value (for example, Ps=0.05) for an environment under which the cooling capacity is most greatly required in the summer season. The adjustment of the low-pressure side pressure set value Ps to be afterwards performed for the purpose of reduction of power consumption is performed so that the low-pressure side pressure set value Ps is higher than the default value, and thus the low-pressure side pressure set value Ps is not reduced to be lower than the default value by the adjustment.

Figure 6:
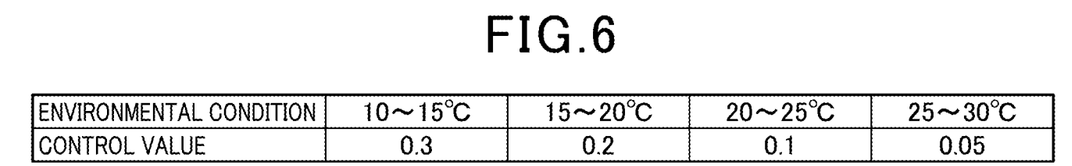
FIG. 6 is a diagram showing environmental condition cells and control values of a refrigerating machine in the present invention.

Under the actual control, the environmental condition is three-dimensionally determined on the basis of the in-store temperature Ti, the out-of-store temperature To and the time zone t. However, in order to simplify the description, the description will be made while attention is paid to only the in-store temperature Ti. In this case, it is assumed that low-pressure side pressure set values Ps of 0.3, 0.2, 0.2 and 0.05 are registered at respective environmental condition cells of 10 to 15°, 15 to 20° C., 20 to 25° C. and 25° C. to 30° C. in in-store temperature Ti, as shown in FIG. 6.

When it is assumed that the in-store temperature Ti as the environmental condition is in the range from 10 to 15° C., the controller 10 determines the cooling states of the storage chambers 39 of the respective low-temperature showcases 1a at a predetermined period (every 10 minutes). This determination is performed by calculating an average deviation temperature Te (deg) per fixed time (actually 10 minutes) from deviation temperature transmitted from each of the low-temperature showcases 1a and determining whether the respective average deviation temperatures Te are not less than a preset threshold value in all the low-temperature showcases 1a.

When the average deviation temperatures Te of all the low-temperature showcases 1a connected to the controller 10 are less than the threshold value, the cooling states of all the low-temperature showcases 1a are determined as "good", and thus it is determined that there is extra cooling capacity. Therefore, the low-pressure side pressure set value Ps is changed and updated to a value which is increased by a fixed value (predetermined step). The controller outputs the changed and updated low-pressure side pressure set value Ps as the control value to the refrigerating machine 11. In the refrigerating machine, the stop and start of the compressor are controlled on the basis of the low-pressure side pressure set value Ps transmitted from the controller 10. At this time, when the low-pressure side pressure set value Ps is set to a high value, the low-pressure side pressure set value Ps at which the compressor is started/stopped is high, so that the cooling capacity is reduced (in a non-cooling direction) and also the power consumption is reduced.

Conversely, when there is at least one low-temperature showcase 1a whose average deviation temperature Te is not less than the threshold value, the cooling state is determined as "not good", and thus it is determined that the cooling capacity is insufficient. Therefore, the low-pressure side pressure set value Ps is changed and updated to a value which is reduced by a fixed value (predetermined step). The controller 10 outputs the changed and updated low-pressure side pressure set value Ps as the control value to the refrigerating machine 11. In the refrigerating machine, the stop and start of the compressor are likewise controlled on the basis of the low-pressure side pressure set value Ps transmitted from the controller 10. At this time, when the low-pressure side pressure set value Ps is set to a low value, the low-pressure side pressure set value Ps at which the compressor is started/stopped is low, so that the cooling capacity is enhanced (in a more greatly cooling direction) and also the power consumption is reduced. Accordingly, the cooling state of the storage chamber 39 is improved.

As described above, the controller 10 changes the low-pressure side pressure set value Ps (control value) at the predetermined period in the direction of reducing the power consumption of the compressor with keeping the minimum cooling level on the basis of the cooling states of the storage chambers 39 of the low-temperature showcases 1a at some environmental condition cell, and updates the value registered at the environmental condition cell concerned to the changed value. The cooling system is operated year by year as described above while conducting learning, whereby the control value suited to each environmental condition cell of the data base 15 is registered at the environmental condition cell concerned.

Next, a case where the environmental condition cell to be referred to is switched will be described. When it is assumed that the in-store temperature Ti as the environmental condition varies from 15° C. to 16° C. (the environmental condition varies), the environmental condition cell to be referred to is switched from a previous environmental condition cell which has been hitherto referred to and has a low-pressure side pressure set value Ps=0.3 registered thereat to a new environmental condition cell having a low-pressure side pressure set value Ps=0.2 registered thereat.

Figure 11:
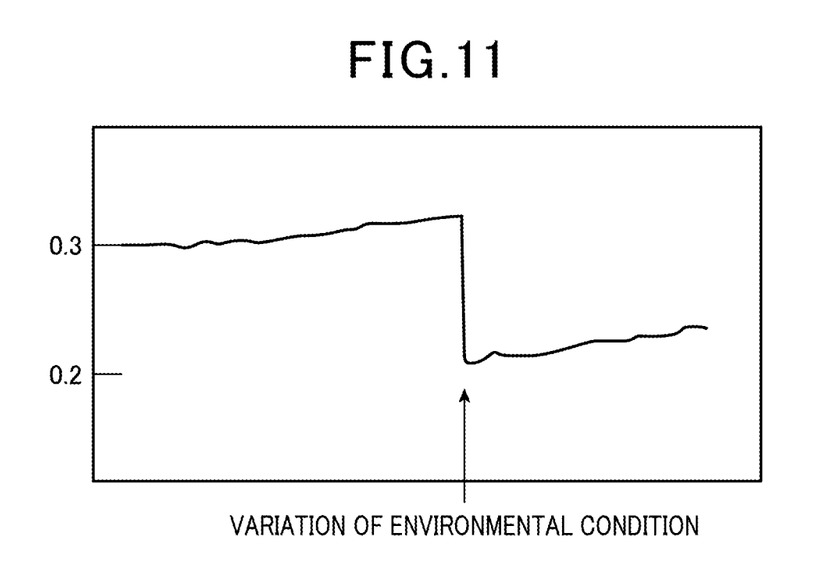
FIG. 11 is a diagram showing the change state of the control values of the refrigerating machine in the present invention.

Accordingly, the control value (low-pressure side pressure set value Ps) output from the controller 10 to the refrigerating machine 11 has been conventionally changed to 0.2. However, when the low-pressure side pressure set value Ps which has been referred to before it is changed is changed under an increasing tendency, that is, under a tendency that the low-temperature showcase 1a is not cooled due to the cooling state of the low-temperature showcase 1a as shown in FIG. 11, the control value has been already changed to a value higher than 0.3, and the control value is drastically reduced from this high value to 0.2.

After the control value is changed to 0.2, the low-pressure side pressure set value Ps is updated so as to reduce the power consumption of the compressor at a predetermined period on the basis of the cooling state of the low-temperature showcase 1a, and finally converged to a proper value. However, the low-pressure side pressure set value Ps is drastically reduced due to only the variation of the environmental condition, that is, it is deviated so as to more cool the low-temperature showcase 1a although the control value of the environmental condition cell which has been hitherto referred to is changed to be higher, that is, so as not to cool the low-temperature showcase 1a. Therefore, much time is taken until the control value is converged to the optimum value.

Therefore, when the environmental condition cell to be referred to is switched due to variation of the environmental condition, the controller 10 according to this invention corrects the control value to be output to the refrigerating machine 11 after the switch in accordance with the tendency of the change of the previous control value (the low-pressure side pressure set value Ps).

Figure 7:
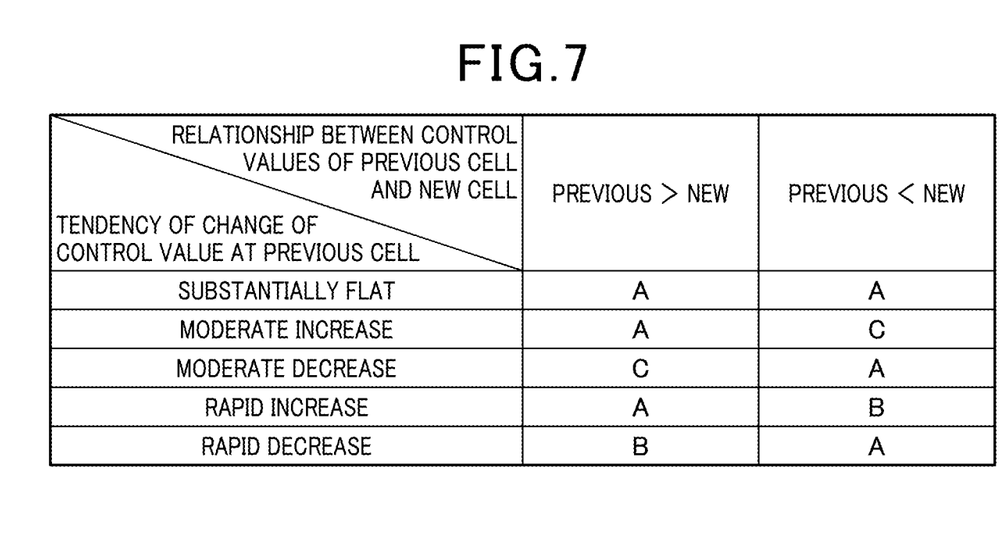
FIG. 7 is a diagram showing correction of the control values of the refrigerating machine in the present invention.

A specific correcting procedure will be described hereunder. In the following description, it is assumed that the same variation of the environmental condition at the case of FIG. 14 occurs. The controller 10 has the following five determination criteria shown at the left side of FIG. 7 as the tendency of the change of the control value (low-pressure side pressure set value Ps) at the environmental condition cell which has been hitherto referred to:

"substantially flat change (or no change)";
"moderate increase (moderate increase in the direction of non-cooling the low-temperature showcase 1a)";
"moderate decrease (moderate decrease in the direction of more greatly cooling the low-temperature showcase 1a)";
"rapid increase (rapid increase in the direction of non-cooling the low-temperature showcase 1a)"; and
"rapid increase (rapid increase in the direction of more greatly cooling the low-temperature showcase 1a)".

Figure 8:
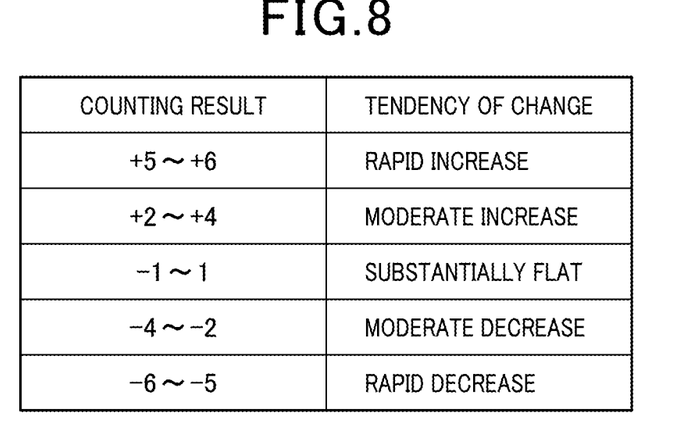
FIG. 8 is a diagram showing a correction determination method for the control values of the refrigerating machine in the present invention.

A method of allocating the tendency of the change to the five conditions is shown in FIG. 8. In this case, the controller 10 stores the changing direction of the control value with respect to latest six periods (60 minutes) in this embodiment. The changing direction corresponds to any one of "no change", "increase" and "decrease", and counting is performed while 0, +1, −1 are allocated to these changing directions, respectively. The counting result is equal to a value between +6 (sequential increase) and −6 (sequential decrease) as shown at the left side of FIG. 8.

When the counting result represents "+5~+6", the tendency of the change is determined as "rapid increase", when the counting result represents "+2~+4", the tendency of the change is determined as "moderate increase", when the counting result represents "−1~+1", the tendency of the change is determined as "substantially flat change (or no change)", when the counting result represents "−4~−2", the tendency of the change is determined as "moderate decrease", and when the counting result represents "−6~−5", the tendency of the change is determined as "rapid decrease".

Subsequently, the magnitude relation between the control value of the environmental condition cell which has been hitherto referred to (a final value obtained by continuing to correct a low-pressure side pressure set value $Ps_O$), and the control value (low-pressure side pressure set value Ps) of the new environmental condition cell to be newly referred to is also set as a determination criterion (FIG. 7). The following methods are adopted for the correction.

A: The control value of the environmental condition cell which has been hitherto referred to (the final value which has been corrected) is directly used even after the change of the environmental condition.

B: The control value registered at the environmental condition cell to be newly referred is used after the change of the environmental condition.

C: The average value or weighted average efficiency between the control value of the environmental condition cell which has been hitherto referred to (the final value which has been corrected) and the control value of the environmental condition cell to be newly referred to is used after the change of the environmental condition.

When the change of the control value of the environmental condition cell which has been hitherto referred to stays substantially flat (or has not changed), the control value concerned is used even after the change of the environmental condition irrespective of the magnitude relation between the control value of the environmental condition cell which has been hitherto referred to (the final value obtained by continuing to correct the low-pressure side pressure set value $Ps_o$) and the control value of the environmental condition cell to be newly referred to.

That is, even when the environmental condition varies from the previous environmental condition cell of the low-pressure side pressure set value Ps=0.3 to the new environmental condition cell of the low-pressure side pressure set value Ps=0.2, the final control value of the environmental condition cell which has bee hitherto referred to is directly used and output as the control value to the refrigerating machine 11 (A of FIG. 7). Even when the environmental condition varies, under a condition that the cooling state of the low-temperature showcase 1a is stable and thus the control value is little changed, the present control value is continuously used even after the switch of the environmental condition cell to be referred to, thereby preventing needless fluctuation of the control value.

When the tendency of the change of the control value of the previous environmental condition cell which has been hitherto referred to corresponds to the moderate increase (the moderate increase in the direction of non-cooling the low-temperature showcase 1a) and also the control value of the new environmental condition to be newly referred to is lower than the control value of the previous environmental condition cell (the tendency that the low-temperature showcase 1a is more greatly cooled), the control value which has been hitherto used is directly used even after the variation of the environmental condition (A of FIG. 7).

Figure 9:
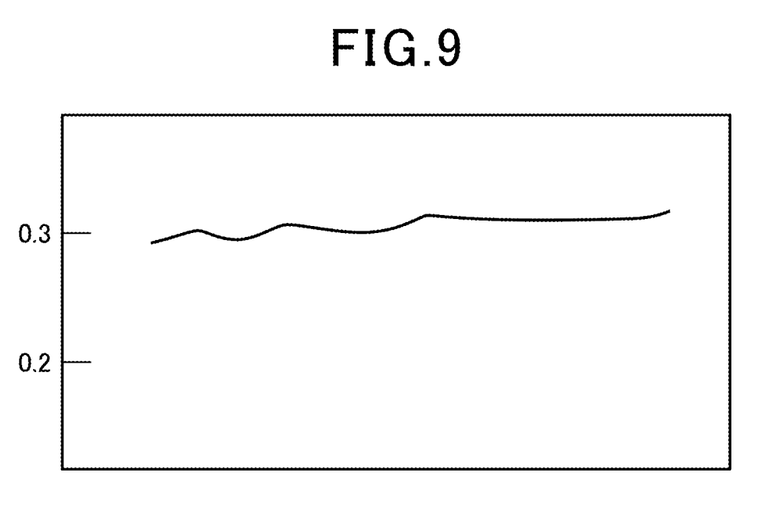
FIG. 9 is a diagram showing the change state of the control values of the refrigerating machine in the present invention.

This aspect is shown in FIG. 9. That is, the fact that the tendency of the change of the control value of the previous environmental condition cell which has been hitherto referred to is the moderately increasing tendency means that the cooling capacity is being moderately surplus. Therefore, when the control value registered at the environmental condition cell after the switch has a more greatly cooling tendency, the present control is continuously used even when the environmental condition cell to be referred is switched, thereby preventing needless increase of the power consumption.

When the tendency of the change of the control value of the previous environmental condition cell which has been hitherto referred corresponds to the moderate increase (the moderate increase in the direction of non-cooling the low-temperature showcase 1a) and also the control value of the new environmental condition cell to be newly referred is higher than the control value of the previous environmental condition cell (has a tendency of non-cooling the low-temperature showcase 1a), the average value or the weighted average efficiency between the control value which has been hitherto used and the control value of the environmental condition cell to be newly referred is used after the environmental condition is changed (C of FIG. 7).

That is, the fact that the tendency of the change of the control value at the previous environmental condition cell which has bee hitherto referred is the moderately increasing tendency means that the cooling capacity is being moderately surplus. Therefore, when the control value registered at the environmental condition cell after the switch has a non-cooling tendency, the average value or weighted average efficiency between the control value which has been hitherto used and the control value of the environmental condition cell to be newly referred is used after the environmental condition to be referred to is changed, thereby preventing needless fluctuation of the control value.

When the tendency of the change of the control value of the previous environmental condition cell which has been hitherto referred to corresponds to the moderate decrease (the moderate decrease in the direction of more greatly cooling the low-temperature showcase 1a) and also the control value of the environmental condition cell to be newly referred to is lower than the control value of the previous environmental condition cell (has a tendency of more greatly cooling the low-temperature showcase 1a), the average value or weighted average efficiency between the control value which has been hitherto used (the latest (final) control value of the environmental condition cell which has been hitherto referred to) and the control value of the environmental condition cell to be newly referred to is used after the variation of the environmental condition (C of FIG. 7).

That is, the fact that the tendency of the change of the control value at the environmental condition cell which has been hitherto referred to is the moderately decreasing tendency means that the cooling capacity is moderately lacking. Therefore, when the control value registered at the environmental condition cell after the switch has a more greatly cooling tendency, the average value or weighted average efficiency between the control value which has been hitherto used and the control value of the environmental condition cell to be newly referred to is used after the variation of the environmental condition to be referred to, thereby preventing needless fluctuation of the control value.

When the tendency of the change of the control value of the previous environmental condition cell which has been hitherto referred to corresponds to the moderate decrease (the moderate decrease in the direction of cooling the low-temperature showcase 1a) and also the control value of the environmental condition cell to be newly referred to is higher than the control value of the previous environmental condition cell (has a tendency of non-cooling the low-temperature showcase 1a), the control value which has been hitherto used even after the variation of the environmental condition (A of FIG. 7).

That is, the fact that the tendency of the change of the control value at the previous environmental condition cell is the moderately decreasing tendency means that the cooling capacity is moderately lacking. Therefore, when the control value registered at the environmental condition cell after the switch ha a non-cooling tendency, the present control value is continuously used even after the environmental condition cell to be referred to is switched, thereby preventing occurrence of lack of the cooling capacity.

When the tendency of the change of the control value of the previous environmental condition cell which has been hitherto referred to corresponds to the rapid increase (the rapid increase in the direction of non-cooling the low-temperature showcase 1a) and also the control value of the environmental condition cell to be newly referred to is lower than the control value of the previous environmental condition cell (has a tendency of more greatly cooling the low-temperature showcase 1a), the control value which has been hitherto used is used even after the variation of the environmental condition (A of FIG. 7).

That is, the fact that the tendency of the change of the control value at the previous environmental condition cell is the rapidly increasing tendency means that the cooling capacity is being rapidly surplus. Therefore, when the control value registered at the environmental condition cell after the switch has a more greatly cooling tendency, the present control value is continuously used even after the environmental condition cell to be referred is switched, thereby preventing needless increase of power consumption.

When the tendency of the change of the control value of the previous environmental condition cell which has been hitherto referred to corresponds to the rapid increase (the rapid increase in the direction of non-cooling the low-temperature showcase 1a) and also the control value of the environment condition cell to be newly referred to is higher than the control value of the previous environmental condition cell (has a tendency of non-cooling the low-temperature showcase 1a), the control value of the environmental condition cell to be newly referred to is used after the variation of the environmental condition (B of FIG. 7).

That is, the fact that the tendency of the change of the control value at the previous environmental condition cell is the rapidly increasing tendency means that the cooling capacity is being rapidly surplus. Therefore, when the control value registered at the environmental condition cell after the switch has a non-cooling tendency, the control value is switched to the control value of the environmental condition cell to be newly referred to and the thus-switched control value is used, whereby the control value can be more quickly converted to the optimum control value and needless increase of the power consumption can be prevented.

When the tendency of the change of the control value of the previous environmental condition cell which has been hitherto referred to corresponds to the rapid decrease (the rapid decrease in the direction of cooling the low-temperature showcase 1a) and also the control value of the environmental condition cell to be newly referred to is lower than the control value of the previous environmental condition cell (has a tendency of more greatly cooling the low-temperature showcase 1a), the control value of the environmental condition cell to be newly referred to is used after the variation of the environmental condition (B of FIG. 7).

Figure 10:
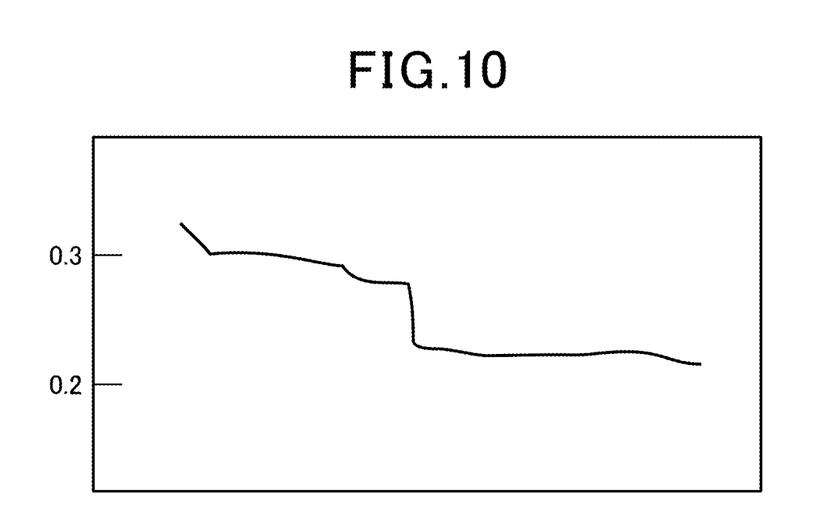
FIG. 10 is a diagram showing the change state of the control values of the refrigerating in the present invention.

This aspect is shown in FIG. 10. That is, the fact that the tendency of the change of the control value at the previous environmental condition cell is the rapidly decreasing tendency means that the cooling capacity is rapidly lacking. Therefore, when the control value registered at the environmental condition cell after the switch has a more greatly cooling tendency, the control value is switched to the control value of the environmental condition cell to be newly referred and the thus-switched control value is used after the environmental condition cell to be referred is switched, whereby the control value can be more quickly converged to the optimum control value and occurrence of lack of the cooling capacity can be avoided.

When the tendency of the change of the control value of the previous environmental condition cell which has been hitherto referred to corresponds to the rapid decrease (the rapid decrease in the direction of cooling the low-temperature showcase 1a) and the control value of the environmental condition cell to be newly referred to is higher than the control value of the previous environmental condition cell (has a tendency of non-cooling the low-temperature showcase 1a), the control value which has bee hitherto used is used even after the variation of the environmental condition (A of FIG. 7).

That is, the fact that the tendency of the change of the control value at the previous environmental condition which has been hitherto referred to is the rapid decreasing tendency means that the cooling capacity is rapidly lacking. Therefore, when the control value registered at the environmental condition cell after the switch has a non-cooling tendency, the present control value is continuously used even after the environmental condition cell to be referred is switched, thereby avoiding occurrence of lack of the cooling capacity.

As to whether the control value which has been corrected as described above is registered in the environmental condition cell conformed with the environmental condition after the variation and updated, setting such as updating or masking for a fixed period after the switch is arbitrarily switched according to the condition or the like of the store in which the system is used.

Furthermore, the environmental condition is not limited to the environmental condition described with reference to the above embodiment. Furthermore, in the above embodiment, the low-pressure side pressure set value of the refrigerating machine is adjusted as the control value, but the control value is not limited to the low-pressure side pressure set value, and any control value may be targeted insofar as it is a control factor associated with the cooling capacity and the power consumption of the cooling system. Furthermore, in this embodiment, the low-pressure side pressure set value is adjusted at the period of 10 minutes. However, the period is not limited to this value, and 1 minute, 30 minutes, 1 hour, 1 hour and 30 minutes, 2 hours or the like may be arbitrarily selected as the adjusting period.

DESCRIPTION OF REFERENCE NUMERALS 1a, 1b low-temperature showcase
10 controller (control apparatus)
11, 12 refrigerating machine
14, 19 electromagnetic valve
15 data base

The invention claimed is:

1. A control apparatus for a cooling system having a low-temperature showcase and a refrigerating machine for supplying refrigerant to the low-temperature showcase, the control apparatus comprising a data base having environmental condition cells at which control values for the refrigerating machine are respectively registered in association with respective environmental conditions, wherein according to a present cooling state of the low-temperature showcase, the control apparatus outputs a control value suitable for the present cooling state to the refrigerating machine, registers the control value in an environmental condition cell conformed with the present environmental condition and changes the control value to thereby construct the data base, and when the environmental condition varies, the controller refers to an environmental condition cell conformed with the environmental condition, corrects a control value registered at the environmental condition cell in accordance with a tendency that the control value has been hitherto changed, and outputs the corrected control value to the refrigerating machine, wherein a control value at a new environmental condition cell to be newly referred to is corrected in accordance with the relationship between a control value at a previous environmental condition cell that has been hitherto referred to and the control value at the new environmental condition cell to be newly referred to and a tendency of change of the control value at the previous environmental condition cell.

2. The control apparatus for the cooling system according to claim 1, wherein the environmental condition is an in-store temperature, an out-of-store temperature and a time zone.

3. The control apparatus for the cooling system according to claim 1, wherein the control value for the refrigerating machine is a low-pressure side pressure set value for controlling an operation of the refrigerating machine.

4. The control apparatus for the cooling system according to claim 1, wherein the control value is changed in accordance with the cooling state of the low-temperature showcase so as to reduce power consumption of the refrigerating machine while the low-temperature showcase is kept to be cooled.

5. The control apparatus for the cooling system according to claim 1, wherein when the tendency of the change of the control value at the previous environmental condition cell stays substantially flat or has not changed, the control value is used even after variation of the environmental condition.

6. The control apparatus for the cooling system according to claim 1, wherein when the tendency of the change of the control value at the previous environmental condition cell that has been hitherto referred to is moderate in a direction of non-cooling the low-temperature showcase, and the control value of the new environmental condition cell to be newly referred to has a tendency of more greatly cooling the low-temperature showcase than the control value of the previous environmental condition cell that has been hitherto referred to, a control value that has been hitherto referred to is used even after variation of the environmental condition.

7. The control apparatus for the cooling system according to claim 1, wherein when the tendency of the change of the control value at the previous environmental condition cell that has been hitherto referred to is moderate in a direction of non-cooling the low-temperature showcase, and the control value at the new environmental condition cell to be newly referred to has a tendency of more greatly non-cooling the low-temperature showcase than the control value of the previous environmental condition cell that has been hitherto referred to, an average value or weighted average efficiency between the control value that has been hitherto used and the control value of the new environmental condition cell is used after variation of the environmental condition.

8. The control apparatus for the cooling system according to claim 1, wherein when the tendency of the change of the control value at the previous environmental condition cell that has been hitherto referred to is moderate in a direction of more greatly cooling the low-temperature showcase and the control value of the new environmental condition cell to be newly referred to has a tendency of more greatly cooling the low-temperature showcase than the control value of the previous environmental condition cell that has been hitherto referred to, an average value or weighted average efficiency between the a control value that has been hitherto used and the control value of the new environmental condition cell to be newly referred is used after variation of the environmental condition.

9. The control apparatus for the cooling system according to claim 1, wherein the tendency of the change of the control value at the previous environmental condition cell that has be hitherto referred to is moderate in a direction of cooling the low-temperature showcase sand the control value of the new environmental condition cell to be newly referred to has a tendency of more greatly non-cooling the low-temperature showcase than the control value of the previous environmental condition cell that has been hitherto referred to, the control value that has been hitherto used is used even after variation of the environmental condition.

10. The control apparatus for the cooling system according to claim 1, wherein the tendency of the change of the control value at the previous environmental condition cell that has been hitherto referred to is rapid in a direction of non-cooling the low-temperature showcase and the control value of the new environmental condition cell to be newly referred to has a tendency of more cooling the low-temperature showcase than the control value of the previous environmental condition cell that has been hitherto referred to, the control value that has been hitherto used is used even after variation of the environmental condition.

11. The control apparatus for the cooling system according to claim 1, wherein when the tendency of the change of the control value at the previous environmental condition that has been hitherto referred to is rapid in a direction of non-cooling the low-temperature showcase and the control value of the new environmental condition cell to be newly referred to has a tendency of more greatly non-cooling the low-temperature showcase than the control value of the previous environmental condition that has been hitherto referred to, the control value of the new environmental condition cell to be newly referred to is used after variation of the environmental condition.

12. The control apparatus for the cooling system according to claim 1, wherein when the tendency of the change of the control value of the previous environmental condition cell that has been hitherto referred to is rapid in a direction of cooling the low-temperature show case and the control value of the new environmental condition cell to be newly referred to has a tendency of more greatly cooling the low-temperature showcase than the control value of the previous environmental condition cell that has been hitherto referred to, the control value of the new environmental condition cell to be newly referred to is used after variation of the environmental condition.

13. The control apparatus for the cooling system according to claim 1, wherein when the tendency of the change of the control value of the previous environmental condition cell that has been hitherto referred to is rapid in a direction of cooling the low-temperature showcase and the control value of the new environmental condition cell to be newly referred to has a tendency of more greatly non-cooling the low-temperature showcase than the control value of the previous environmental condition cell that has been hitherto referred to, the control value that has been hitherto used is used even after variation of the environmental condition.

\* \* \* \* \*